United States Patent [19]

Tsuji et al.

[11] Patent Number: 4,841,479
[45] Date of Patent: Jun. 20, 1989

[54] METHOD FOR PREPARING A SIMULATION PROGRAM

[75] Inventors: Michiru Tsuji, Hino; Chisato Konno, Inagi; Miyuki Saji, Funabashi, all of Japan

[73] Assignee: Hitachi, Ltd., Tokyo, Japan

[21] Appl. No.: 16,406

[22] Filed: Feb. 19, 1987

[30] Foreign Application Priority Data

Mar. 14, 1986 [JP] Japan .................................. 61-54762

[51] Int. Cl.$^4$ ...................... G06F 3/02; G06F 15/328
[52] U.S. Cl. .................................. 364/900; 364/300; 364/578
[58] Field of Search .............. 364/200, 300, 900, 735, 364/221.1, 274.1, 280.4, 916.3, 945.7, 973

[56] References Cited

U.S. PATENT DOCUMENTS 4,398,249  8/1983  Pardo et al. ........................ 364/300
4,677,587  6/1987  Zemany, Jr. ........................ 364/900

OTHER PUBLICATIONS

Panattoni: Algorithm for Solution of Partial Differential Equation by Means of a Finite Difference Nonregular Scheme, IBM Technical Disclosure Bull., vol. 20, No. 10, Mar. 1978, pp. 3969–3971.

*Primary Examiner*—Felix D. Gruber
*Attorney, Agent, or Firm*—Antonelli, Terry & Wands

[57] ABSTRACT

A method for automatically generating by use of a computer a simulation program for simulating a phenomenon in a region by discretizing automatically data of a partial differential equation inputted when the partial differential equation and boundary conditions governing the phenomenon and data representing the shape of a region, which is an object of calculation, are given, by using a discretization rule by the finite differential method, and for generating a program calculating numerical values representative of the phenomenon determined by the partial differential equation over the whole object region of calculation by the finite differential method on the basis of the equation after the discretization, wherein the object region of calculation is divided into a plurality of blocks, each of which has the same differential equation and the same discretization rule and a program is generated which calculates, for each of the blocks numerical values representative of the phenomenon determined by the partial differential equation and the discretization rule both applied for each of the blocks by the finite differential method.

2 Claims, 15 Drawing Sheets

FIG. 1
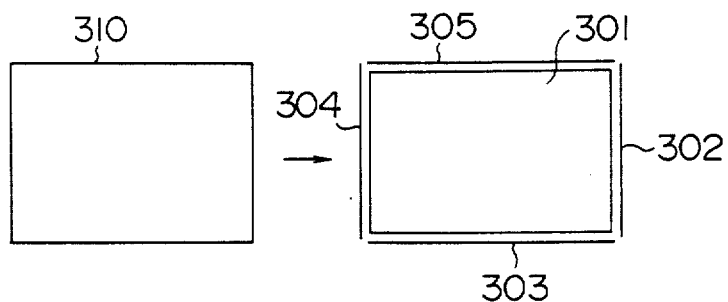
FIG. 2
DIFFERENCE RULE : $\frac{\delta}{\delta x} = (\partial_{i+\frac{1}{2}} - \partial_{i-\frac{1}{2}})/\Delta x_{i+\frac{1}{2}}$
FOR $u = \frac{\delta}{\delta x}(\frac{\delta u}{\delta x})$ (2ND ORDER)
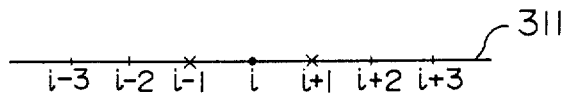
FOR $u = \frac{\delta}{\delta x}(\frac{\delta}{\delta x}(\frac{\delta u}{\delta x}))$ (3RD ORDER)
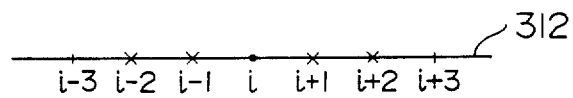
● : POINT TO BE CALCULATED
× : POINT TO BE REFERRED TO
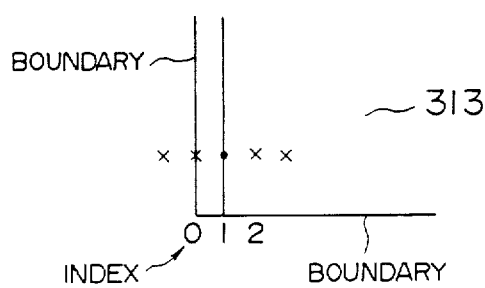

DIFFERENCE RULE: $\frac{\delta}{\delta x} = (\partial_{i+1} - \partial_{i-1})/\Delta x_i$ FOR $u = \frac{\delta}{\delta x}\left(\frac{\delta u}{\delta x}\right)$ (2ND ORDER)

```
  +--x----x----x----•----x----x----x----+
 i-3  i-2  i-1   i   i+1  i+2  i+3
```

• : POINT TO BE CALCULATED
× : POINT TO BE REFFERED TO $A1 = (0, [0:15])$
$A2 = ([0:10], 15)$
$A3 = (10, [10:15])$
$A4 = ([10:20], 10)$
$A5 = (20, [0:10])$
$A6 = ([0:20], 0)$
$B1 = ((0:10), (10:15))$
$B2 = ((0:20), (0:10))$

FIG. 6

$\text{div}(D * \text{grad}(u)) = 0$   AT B1
$\text{div}(D * \text{grad}(u)) - u = 0$   AT B2

$\vec{n} \, \text{grad}(u) = \lambda$   AT A1+A2+A3+A4+A5
$u = 0$   AT A6

FIG. 7

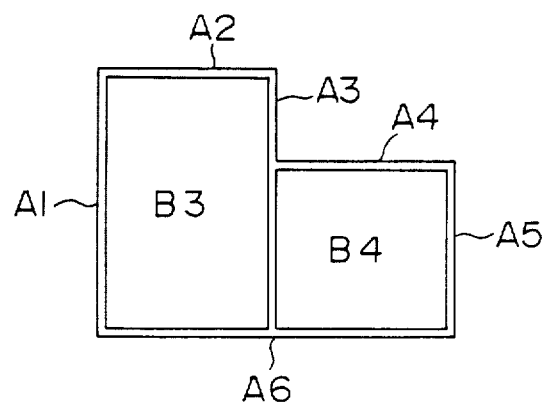

$dx(@) = (@\langle i+0.5\rangle - @\langle i-0.5\rangle)/d\ell x(i+0.5)$
  AT B3+B4+A2+A4+A6,
$dx(@) = (@\langle i+1\rangle - @\langle i\rangle)/d\ell x(i+1)$   AT A1,
$dx(@) = (@\langle i\rangle - @\langle i-1\rangle)/d\ell x(i)$   AT A3+A5,
$dy(@) = (@\langle j+0.5\rangle - @\langle j-0.5\rangle)/d\ell y(j+0.5)$
  AT A1+A3+A5+B3+B4,
$dy(@) = (@\langle j+1\rangle - @\langle j\rangle)/d\ell y(j+1)$   AT A6,
$dy(@) = (@\langle j\rangle - @\langle j-1\rangle)/d\ell y(j)$   AT A2+A4,

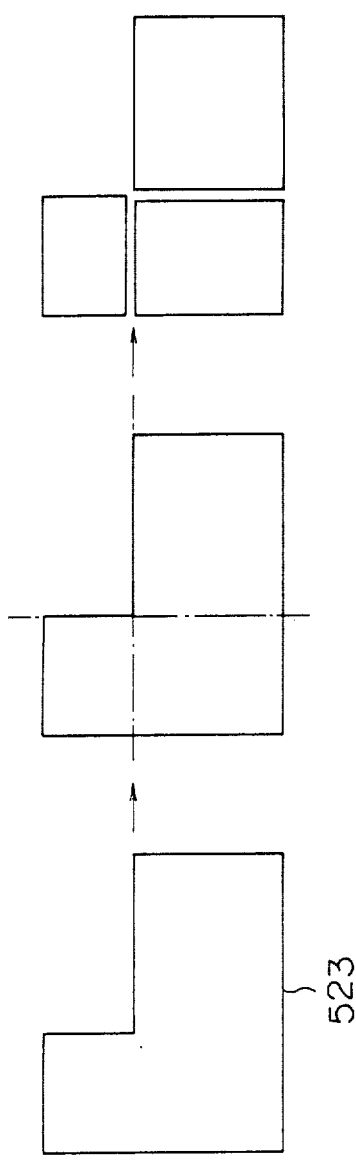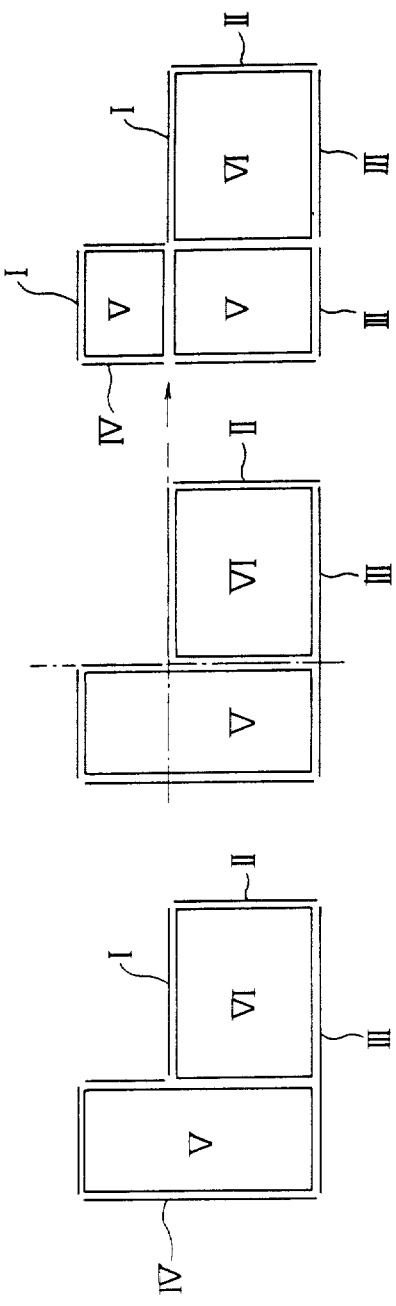

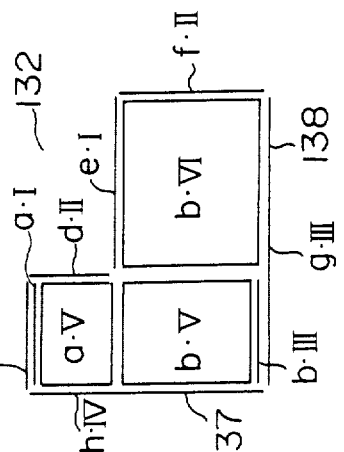
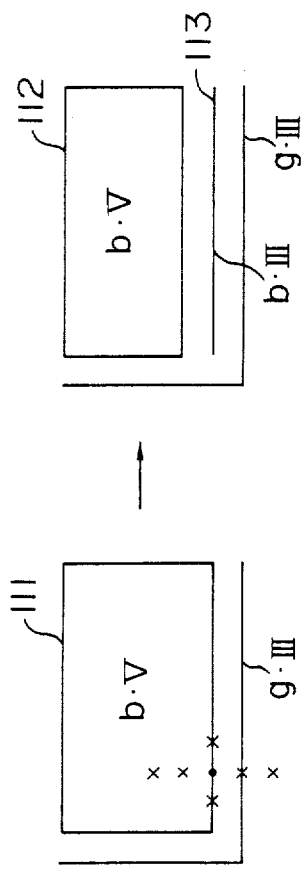
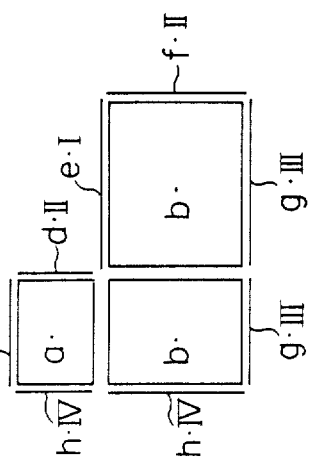
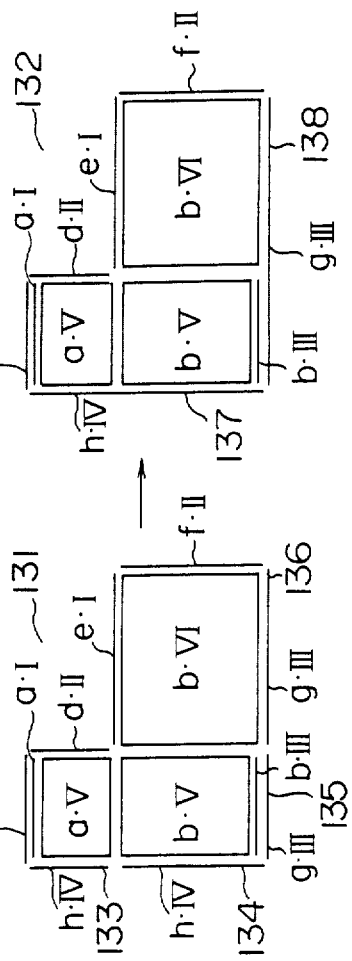
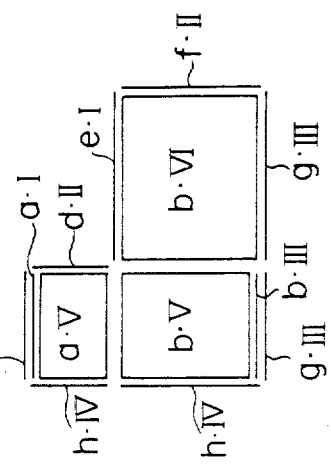

F I G. 18

| DIFFERENTIAL OPERATOR | INDEX OF REGION | DIFFERENCE RULE |
|---|---|---|
| $\frac{\delta}{\delta x}$ | $0 < x < 10, \ 0 < y < 20$ | $(\partial_{i+\frac{1}{2}} - \partial_{i-\frac{1}{2}})/d\ell x_{i+\frac{1}{2}}$ |
| | $10 \leq x < 20, \ 0 < y < 15$ | $(\partial_{i+\frac{1}{2}} - \partial_{i-\frac{1}{2}})/d\ell x_{i+\frac{1}{2}}$ |
| | $x = 0, \ 0 \leq y \leq 20$ | $(\partial_{i+1} - \partial_i)/d\ell x_{i+1}$ |
| | $x = 10, \ 15 \leq y \leq 20$ | $(\partial_i - \partial_{i-1})/d\ell x_i$ |
| | $x = 20, \ 0 \leq y \leq 15$ | $(\partial_i - \partial_{i-1})/d\ell x_i$ |
| $\frac{\delta}{\delta y}$ | $0 < x < 20, \ y = 0$ | $(\partial_{i+\frac{1}{2}} - \partial_{i-\frac{1}{2}})/d\ell x_{i+\frac{1}{2}}$ |
| | $0 < x < 10, \ y = 20$ | $(\partial_{i+\frac{1}{2}} - \partial_{i-\frac{1}{2}})/d\ell x_{i+\frac{1}{2}}$ |
| | $10 < x < 20, \ y = 15$ | $(\partial_{i+\frac{1}{2}} - \partial_{i-\frac{1}{2}})/d\ell x_{i+\frac{1}{2}}$ |
| | $0 < x < 10, \ 0 < y < 20$ | $(\partial_{j+\frac{1}{2}} - \partial_{j-\frac{1}{2}})/d\ell y_{j+\frac{1}{2}}$ |
| | $10 \leq x < 20, \ 0 < y < 15$ | $(\partial_{j+\frac{1}{2}} - \partial_{j-\frac{1}{2}})/d\ell y_{j+\frac{1}{2}}$ |
| | $x = 0, \ 0 < y < 20$ | $(\partial_{j+\frac{1}{2}} - \partial_{j-\frac{1}{2}})/d\ell y_{j+\frac{1}{2}}$ |
| | $x = 10, \ 15 < y < 20$ | $(\partial_{j+\frac{1}{2}} - \partial_{j-\frac{1}{2}})/d\ell y_{j+\frac{1}{2}}$ |
| | $x = 20, \ 0 < y < 15$ | $(\partial_{j+\frac{1}{2}} - \partial_{j-\frac{1}{2}})/d\ell y_{j+\frac{1}{2}}$ |
| | $0 \leq x \leq 20, \ y = 0$ | $(\partial_{j+1} - \partial_j)/d\ell y_j$ |
| | $0 \leq x \leq 10, \ y = 20$ | $(\partial_j - \partial_{j-1})/d\ell y_j$ |
| | $10 \leq x \leq 20, \ y = 15$ | $(\partial_j - \partial_{j-1})/d\ell y_j$ |

FIG. 20

| | BASIC REGION TABLE OF X-COORDINATE | 541 |
|---|---|---|
| | X : LOWER INDEX | X : UPPER INDEX |
| 1 | | |
| 2 | | |
| 3 | | |
| ⋮ | | |

| | BASIC REGION TABLE OF Y-COORDINATE | 542 |
|---|---|---|
| | Y : LOWER INDEX | Y : UPPER INDEX |
| 1 | | |
| 2 | | |
| 3 | | |
| ⋮ | | |

| | BASIC REGION TABLE | | | 543 |
|---|---|---|---|---|
| | X : LOWER INDEX | X : UPPER INDEX | Y : LOWER INDEX | Y : UPPER INDEX |
| 1 | | | | |
| 2 | | | | |
| 3 | | | | |
| 4 | | | | |
| | | | | |

FIG. 21

```
      REAL N(IDXP2:IDXP9,IDXP2:IDXP9), NOLD(IDXP2:IDXP9,  ⎫
      REAL **X(IDXP2:IDXP9,IDXP2:IDXP9), **Y(IDXP2:IDXP9,IDXP2:IDXP9) ⎬ 181
                                                                       ⎭
    ...                                                           ⎫ 182
      J=IDXP9                                                     ⎭
      DO 20 I=IDXP3,IDXP8
      N(I,J)=-((A1(I,J)*1.0/DLX(I+1))*N(I+1,J)*1.0/DLY(J))*N(I+           ⎫
     &1,J))/2.0/*J2(I,J)/2.0)+A1(I,J)*1.0/DLX(I))/2.0-(A1(I,J)*1          │
     &.0/((DLX(I+1)+DLX(I))/2.0)**Y(I,J-1)/DLY(J)*N(I,J-1)*1.0            │
     &/((DLX(I+1)+DLX(I))/2.0)+(A2(I,J)*1.0/((DLX(I+1)+DLX(I))/2.0        │
     &.0/((DLX(I))/2.0))**X(I,J)**X(I,J)**N(I,J-1)*1.0/DLY(J)**N(I,       │
     &J-1)/(DLX(I))/2.0-(A2(I,J)*1.0/DLY(J)+DLX(I+1)+DLX(I))/2.0          │
     &2(I,J)*1.0/DLY(J))**X(I,J)**N(I-1,J)*1.0/((DLX(I)+DLX(I-1))/D       │
     &LX(I+1))-(A2(I,J)/((DLX(I+1)+DLX(I))/2.0)**X(I,J-1)*1.0/((          ⎬ 183
     &DLY(J))+0.0/((DLX(I+1))/2.0)+(A2(I,J)*1.0/((DLX(I+1)+DLX(I))/2      │
     &.0/((DLY(J))/2.0))**X(I,J)**X(I,J)**N(I,J-1)*1.0/DLY(J)+DLX(I+1)    │
     &.0/((DLX(I+1)+DLX(I))/2.0-(A2(I,J-1)-(CA                            │
     &I,J-1))**Y(I,J)/DLY(J)/2.0)**X(I,J)*1.0/((DLX(I+1)+DLX(I))/2.0      │
     &I,J))/2.0-((DLY(J))/2.0)**X(I,J+1)/DLY(J)*N(I,J+1)*1.0/((           │
     &DLX(I))/2.0)/DLY(J)))                                               ⎭
   20 CONTINUE
    ...
      STOP
      END
```

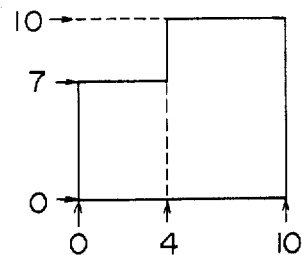

FIG. 24

BASIC REGION TABLE OF X-COORDINATE

| 0 |
| --- |
| 1~3 |
| 4 |
| 5~9 |
| 10 |

BASIC REGION TABLE OF Y-COORDINATE

| 0 |
| --- |
| 1~6 |
| 7 |
| 8~9 |
| 10 |

BASIC REGION TABLE

| 0 | 0 |
| --- | --- |
| 0 | 1~6 |
| 0 | 7 |
| 0 | 8~9 |
| 0 | 10 |
| 1~3 | 0 |
| 1~3 | 1~6 |
| 1~3 | 7 |
| ⋮ | ⋮ |

FIG. 25

$$\frac{\delta}{\delta x}\left(\frac{\delta u}{\delta y}\right)$$

$$\downarrow \quad \longleftarrow \frac{\delta u}{\delta y} = \frac{u_{j+1} - u_{j-1}}{\Delta y_j}$$

$$\frac{\delta}{\delta x}\begin{pmatrix} X: & 0 & 0 \\ Y: & -1 & 1 \end{pmatrix}$$

$$\downarrow \quad \longleftarrow \frac{\delta u}{\delta x} = \frac{u_{i+1} - u_{i-1}}{\Delta x_i}$$

$$\begin{pmatrix} X: & -1 & 1 \\ Y: & 0 & 0 \end{pmatrix} \begin{pmatrix} X: & 0 & 0 \\ Y: & -1 & 1 \end{pmatrix}$$

$$\downarrow$$

$$\begin{pmatrix} X: & -1 & 1 \\ Y: & -1 & 1 \end{pmatrix}$$

METHOD FOR PREPARING A SIMULATION PROGRAM

BACKGROUND OF THE INVENTION

This invention relates to a method for preparing a numerical calculation program for representing numerically physical phenomena by means of a partial differential equation describing them and displaying them schematically (hereinbelow called simulation) and in particular to a method for preparing a numerical calculation program simulating the distribution of physical quantities in a certain space such as in the analysis of electromagnetic field, heat conduction, fluid, etc.

Since such a numerical calculation program varies depending on the form of the object region for the simulation, the equation (in general partial differential equation) representing the physical law governing a physical phenomenon and conditions at the boundary of the region, it is laborious to prepare a program therefor. Consequently it is desirable to prepare automatically the program based on simple input data.

Heretofore there have been proposed some programs for such a programming (e.g. Morris, S. M. et al., "SALEM-A programming System for the Simulation of Systems Described by Partial Differential Equation", Proc. Fall Joint Computer Conf., vol. 33, pp. 353-357 (1968); Cardenas, A. F. et al. "A Language for Partial Differential Equations", Comm. ACM; vol. 13, No. 3, pp. 184-191 (1970. 3); Rice, J. R. et al. "ELLPACK progress and plans, in Elliptic Problem Solvers", pp. 135-162, Academic Press (1981); and IMSL Inc., "TWODEPEP: A finite Element Program", 3rd. ed. (1982)).

Since there are restrictions concerning the form of the partial differential equation according to the prior art techniques, which can be an object of a simulation, in order to remove them, there have been published a programming language called Differential Equation Solver and programs for preparing a numerical simulation program by using it. For example there has been published the outline of a method for preparing a program permitting numerical calculations for a partial differential equation simulating a physical phenomenon on the basis of the finite differential method in Transactions of 26th National Conference of Information Processing Society of Japan, pp. 427-432 (1983. 3).

A physical phenomenon is determined by giving a partial differential equation governing an unknown physical quantity, a spatial region which is a domain of the equation, and boundary or initial conditions therefor. A numerical calculation reproducing simulatively a physical phenomenon by using a computer can be carried out by an approximate calculation called finite differential method, when a partial differential equation describing it, boundary conditions therefor, a spatial region, instructions specifying how the spatial region is divided in a mesh form and the method how differential operators contained in the partial differential equation, the boundary conditions and the initial conditions are discretized (approximately representing the physical quantity at each mesh point governed by the partial differential equation by using the same physical quantity at mesh points surrounding it) are defined.

However, a usual numerical simulation by means of a general purpose computer can realize its function only with information stated above. Therefore, according to the prior art techniques previously stated, the control of the numerical simulation using the necessary minimum number of specifications is enabled by disposing a mechanism automatically preparing a program for controlling the general purpose computer on the basis of the above specifications.

Here a method for preparing automatically a FORTRAN program, where a partial differential equation is discretized by the finite differential method, is taken as an example. Usually, at a programming an operation is performed, by which a single module or a DO loop is formed for a plurality of blocks, for each of which the same processings can be effected.

According to the prior art techniques stated above, the program has only a function to divide the mesh points into those inside of the object region of the calculation and those on the boundary, for which a DO loop is used as a unit. For example, a rectangular object region 310 of the calculation, as indicated in FIG. 1, is divided into a plurality of regions indicated by 301 to 305 and the calculation program is prepared by forming a DO loop for each of the regions as a unit. For this reason, there was a problem that it was not possible to take measures in the case where the number of orders of the partial differential equation is increased, in the case where the difference rule is changed, in the case where the form of the region is not rectangular, or in the case where the partial differential equation or the difference rule is different locally. Concretely speaking, as indicated in FIG. 2, in the case where the discretization is effected with a difference rule of $$\frac{\partial}{\partial x} = (@_{i+\frac{1}{2}} - @_{i-\frac{1}{2}})/\Delta x_{i+\frac{1}{2}}$$

for a second order partial differential equation, the value at a point i (point indicated by .) to be calculated is obtained by referring to the values at the points $i-1$, $i+1$ (points indicated by X) directly adjacent to the point i (FIG. 2, 311). On the other hand, for the third order partial differential equation, the value at the point is obtained by referring to the values at the points adjacent but one (FIG. 2, 312). For this reason, as indicated by 313 in FIG. 2, the reference points can be outside of the boundary, depending on the point to be calculated, and this gives rise to an inconvenience in the calculation. Further, in the case where a difference rule of $$\frac{\partial}{\partial x} = (@_{i+i} - @_{i-i})/\Delta x_i$$

is used, as indicated in FIG. 3, even for a second order partial differential equation, calculation is effected while referring to the points adjacent but one to the relevant point, and this gives rise to the same problem as that for a higher order partial differential equation. When the object region of calculation is not rectangular, it is possible to form a DO loop, only if not only the mesh points are divided into those inside of the boundary and those on the boundary, but also the region, where the points inside the boundary exist, is divided, depending on the shape of the region. Consequently it was not possible to form any calculation program according to the prior art techniques.

SUMMARY OF THE INVENTION

An object of this invention is to provide a method for preparing automatically a numerical calculation program according to the finite differential method, in the case where an arbitrary partial differential equation and boundary condition as well as an arbitrary object region of calculation, an arbitrary difference rule are given, which method permits to resolve the problem described above of the prior art techniques.

Further, an object of this invention is to provide the method for preparing automatically a numerical calculation program wherein the number of DO loops in the calculation program is minimal.

The objects described above are achieved by disposing region dividing portions, which divide an object region of calculation into a plurality of groups of mesh points, each of which has the same partial differential equation and the same discretization rule, when an arbitrary partial differential equation and boundary condition as well as the shape of an object region of calculation and a discretization rule by the finite differential method are given. A numerical simulation program is generated by the generating portion of FORTRAN codes so that the program includes a DO loop for each group of mesh points which are formed by the region dividing portion.

The region dividing portions divide a given object region of calculation, depending on the type of the partial differential equation, the sort of the discretization rule by the finite differential method, and the shape of the object region of calculation. Then, the maximum value is obtained for a region, where the distance from each of the discretizing points (hereinbelow called mesh points) to a point to be referred to (hereinbelow called reference point) can exist. In the case where a selected discretization rule at a relevant mesh point is not suitable (i.e. in the case where the reference point is outside of the object region of calculation, as indicated by 313 in FIG. 2), the discretization formula is replaced by another and the object region of calculation is again divided in the regions, where the discretization rule has been replaced. Further, regions adjacent to each other, which have the same partial differential equation and the same discretization rule, are merged.

By using this method it is possible to find a group of mesh points having the same partial differential equation and the same discretization rule and further to make the number of the groups of mesh points minimal. In addition, it is possible to prevent to refer to mesh points outside of the object region of calculation, when the partial differential equation is discretized.

The generating portion of FORTRAN code forms FORTRAN DO loops based on information of the groups of mesh points obtained by means of region dividing portions and prepares automatically a numerical simulation program with the discretization result of the partial differential equation obtained by the portion of discretization.

BRIEF DESCRIPTION OF THE DRAWINGS

FIG. 1 is a scheme showing a prior art region division;

FIG. 2 is a scheme for explaining the width of discretization;

FIG. 3 is a scheme for explaining the discretization rule;

FIGS. 5, 6 and 7 indicate examples of inputted information;

FIGS. 9 to 16 indicate examples of region divisions;

FIG. 18 indicates examples of the structure of intermediate data;

FIG. 20 indicates further examples of tables used for the region divisions;

FIG. 21 indicates an example of generated FORTRAN numerical simulation program;

FIG. 24 illustrates an example of generation of a table used for region division; and FIG. 25 is a scheme illustrating the calculation of the width of discretization.

DESCRIPTION OF THE PREFERRED EMBODIMENTS

Figures 3, 5:
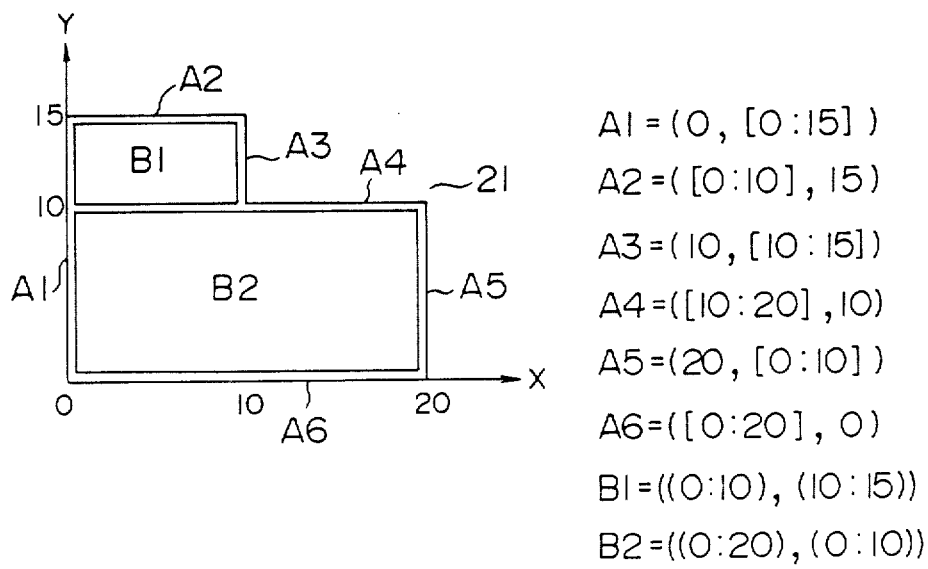

Hereinbelow the maximum value, which the distance from a relevant mesh point to the reference point (internal between the mesh points) can have, is called width of discretization or simply width and further the discretization rule, in the case where the discretization is effected by the finite differential method, is called especially difference rule.

Hereinbelow an embodiment of this invention will be explained, referring to the drawings.

Figure 4:
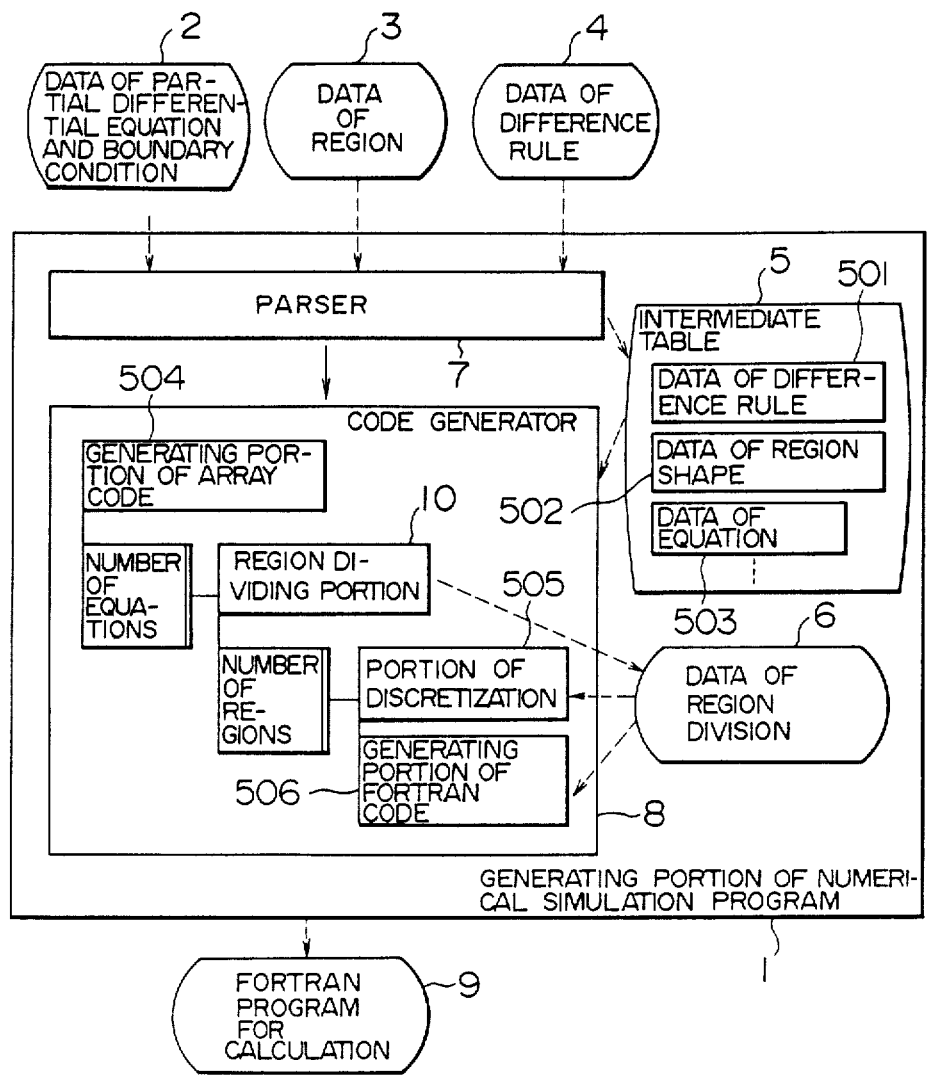
FIG. 4 is a block diagram showing the whole structure of the numerical simulation program generating portion.

FIG. 4 is a summarized flow chart for the generating portion of numerical simulation program 1 according to this invention. In the generating portion of numerical simulation program 1, when data of partial differential equation and boundary condition 2, data of region 3, and data of difference rule 4 are inputted therein in the form of a program, a FORTRAN program for a numerical simulation calculation is generated.

At first the in/output formulation will be shown. FIG. 5 shows an example of the data of region. The partial regions of the object region are denominated, as indicated in 21 of FIG. 5, and described together with their extension. For example, A1 is a region, which is at 0 in the x-direction and extends from 0 to 15 in the y-direction.

FIG. 6 indicates an example of the data of partial differential equation and boundary condition 2. The data 2 is given for each of the partial regions specified by the data of region 3. In this example, div (D*grad (u))=0 at B1 shows that in the region B1 an equation div (D*grad (u))=0 is valid.

FIG. 7 indicates an example of the input data of difference rule 4. The data 4 is given for each of the partial domains, like the data of partial differential equation 2 and defines the discretization rule of the first order differential operator.

FIG. 21 indicates an output of the generating portion of numerical simulation program, which is an example of FORTRAN programs.

Figure 22:
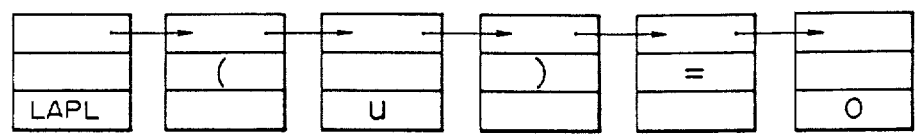
FIGS. 22 and 23 indicate further examples of the structure of intermediate data.
Figure 23:
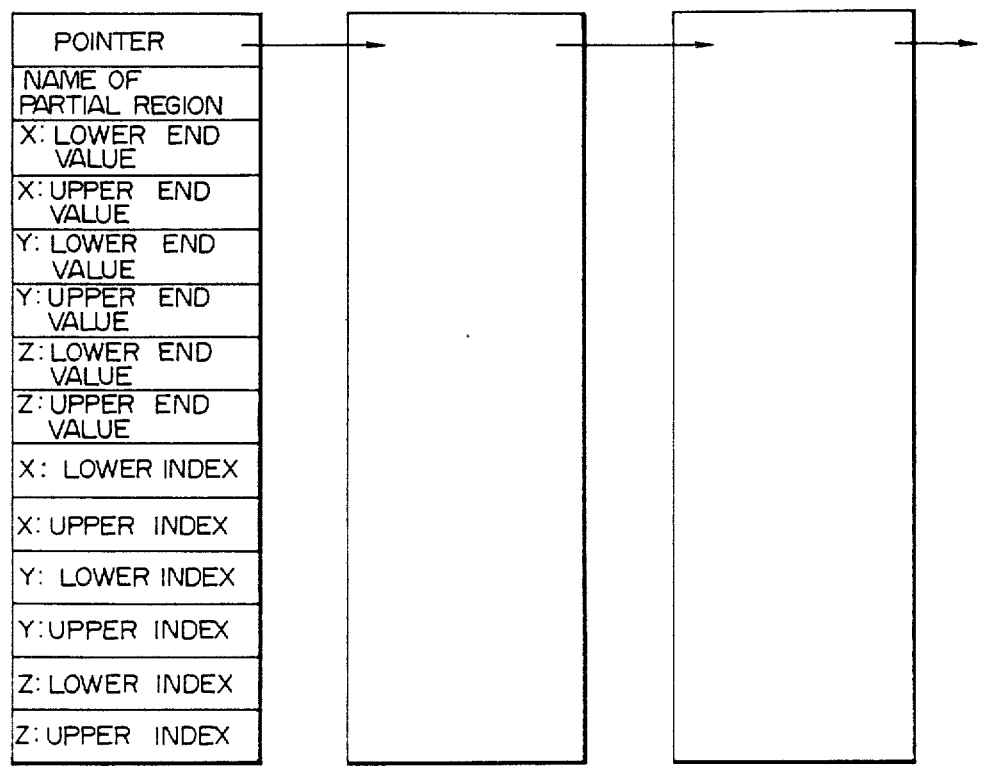

In FIG. 4, the inputted data of partial differential equation and boundary condition 2, the data of region 3 and the data of difference rule 4 are delivered to a parser 7 and stored in an intermediate table 5 as intermediate data after the text structure check. The data of partial differential equation and boundary condition 2, the data of region 3 and the data of difference rule 4 are kept in the intermediate table respectively as the data of equation 503, the data of the shape of the region 502 and the intermediate data of difference rule 501. FIG. 22 shows the structure of the data of equation; FIG. 23 that of the data of the shape of the region; and FIG. 18 that of the intermediate data of difference rule.

Subsequently, in the code generator 8, a FORTRAN numerical simulation program is generated on the basis of the generated intermediate table. The processing in the code generator 8 consists of a generating portion of array code 504 preparing an array declaration portion, a region dividing portion obtaining the extent of the DO loop at the calculation of the partial differential equation, a portion of discretization 505, which discretizes the partial differential equation according to the difference rule and a generating portion of FORTRAN code 506, which generates a FORTRAN calculation program based on the extent of the DO loop and discretization results of the equation.

In the generating portion of array code, the magnitude of the array is obtained, on the basis of the data of the shape of region, with respect to the variable, which is object of the analysis, and a FORTRAN DIMENSION sentence is formed. In the data of the shape of region (FIG. 23), since the coordinate regions of each of the partial regions and the indices corresponding to the mesh are kept, it is possible to obtain the magnitude of the array, starting from the scope of the indices including the object region of analysis.

Figure 17:
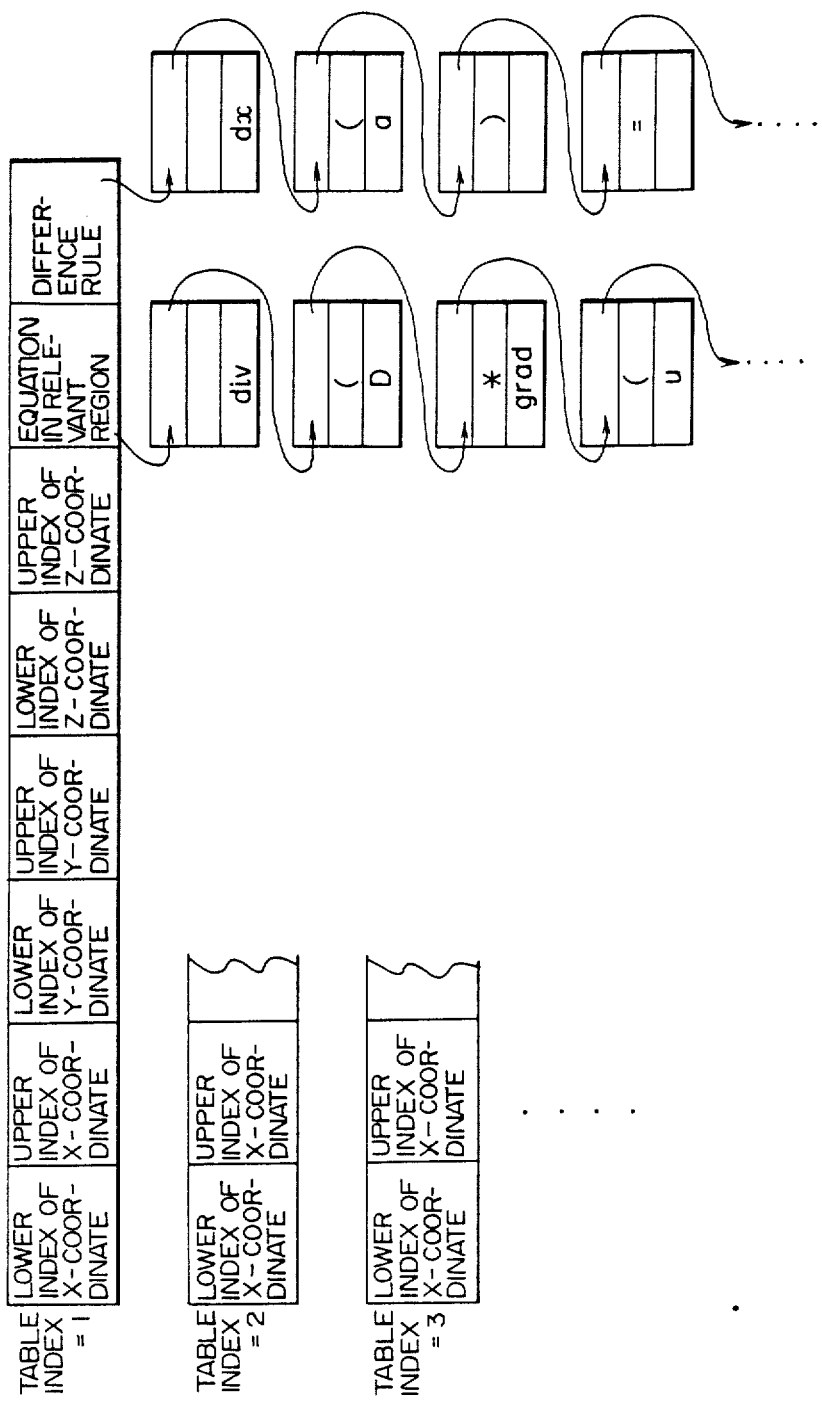
FIG. 17 indicates examples of tables used for the region divisions.

In the region dividing portion 10, the given object region of analysis is divided into a plurality of groups of mesh points each of which has the same partial differential equation and can be discretized by the same discretization method. A DO loop is formed for each of the partial regions generated by the division. (The region dividing portion 10 will be described later more in detail.) FIG. 17 indicates the structure of the region dividing data generated in the region dividing portion. As indicated in the figure, the region dividing data are in a record form for each of the partial regions obtained by division and the indices in the x-, y- and z-directions, the equations corresponding to the regions as well as the difference rule are held. The index regions in the x-, y- and z-directions are those for their DO loop.

In the portion of discretization 505 a FORTRAN calculation program is generated on the basis of the indices in the directions of the axes of the data of region division and the discretization results of the equation. In the example of the generated FORTRAN indicated in FIG. 21 the reference numeral 181 represents the generating portion of FORTRAN code. 182 and 183 represent FORTRAN codes generated by the portion of discretization 505 and the generating portion of calculation code 506, respectively.

Now the region dividing portion, which is the center of this invention, will be explained below more in detail. The region dividing portion 10 is a portion, where groups of mesh points are obtained, in each of which the same partial differential equation can be discretized by the same discretization method on the basis of the given object region of analysis, partial differential equation and difference rule and the results obtained there are stored in the region dividing data as DO loop information for preparing a FORTRAN calculation program.

Figure 8:
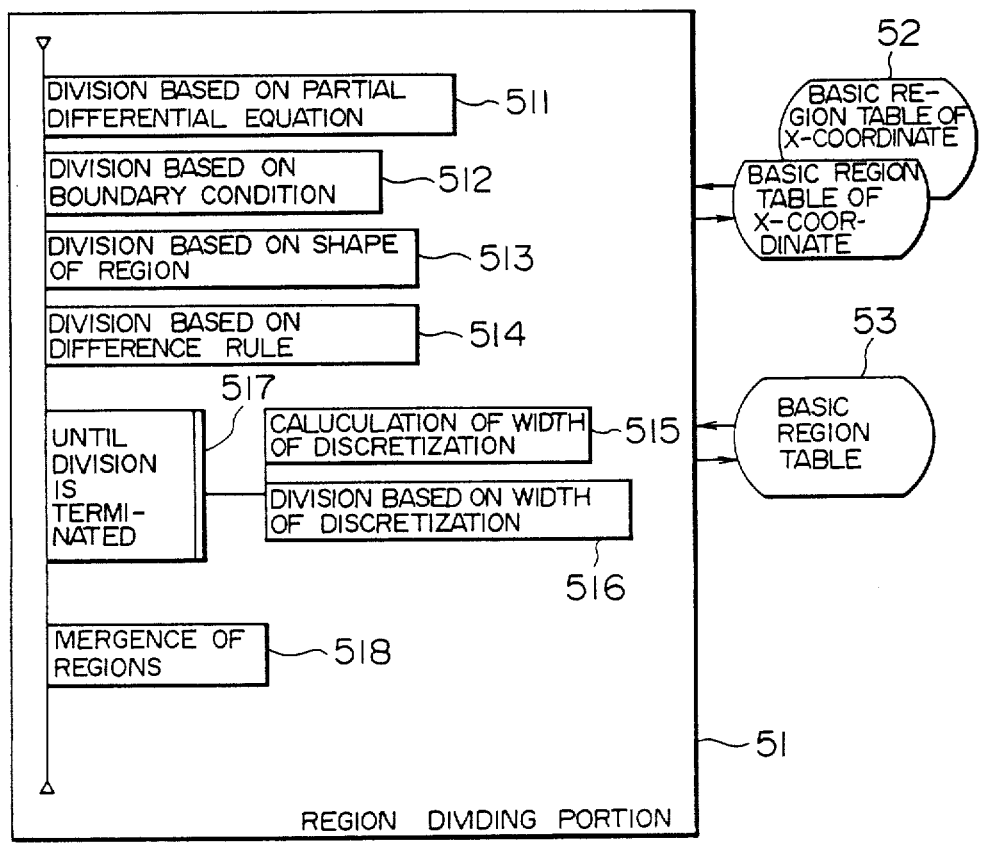
FIG. 8 illustrates processing flows for the region dividing portions.
Figure 9:
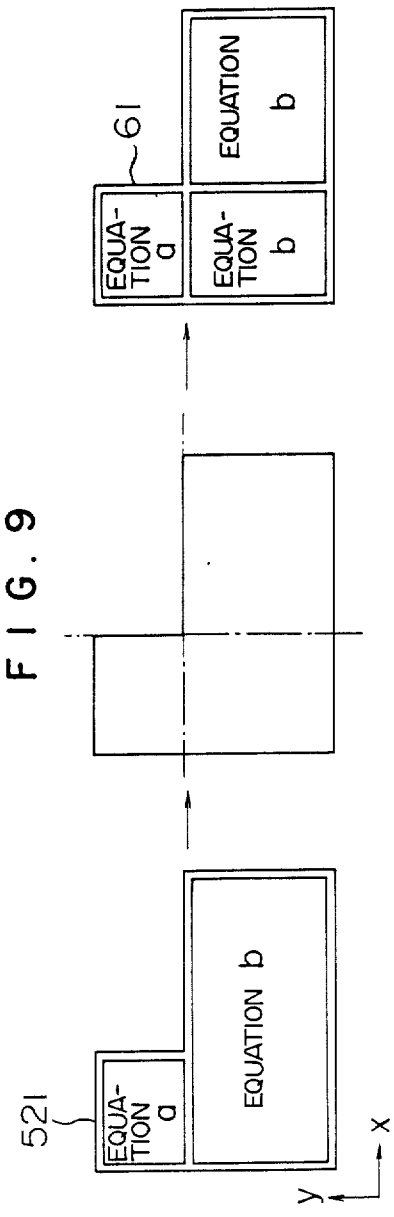
Figure 10:
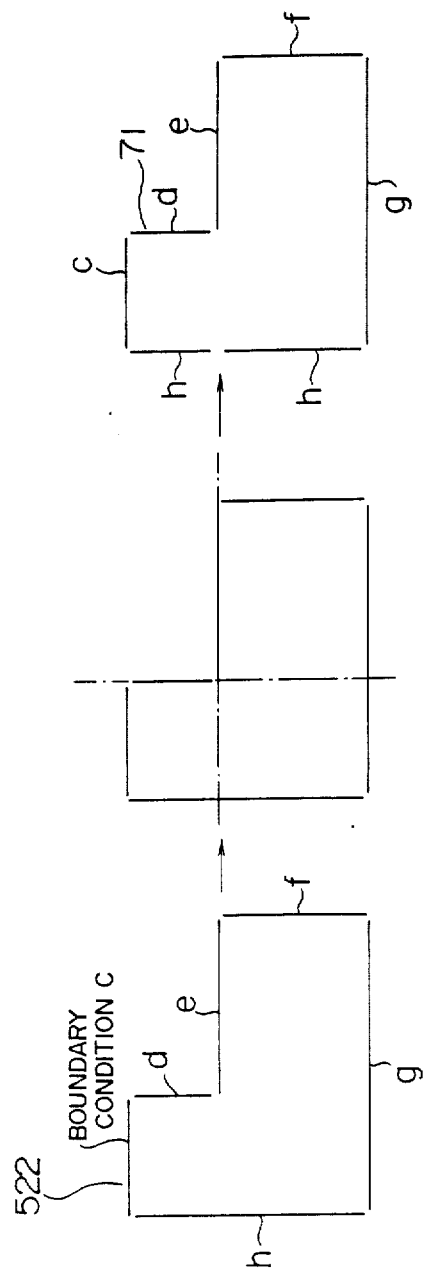

In FIG. 8, at first, the region is divided by using the partial differential equation (step 511), in order to obtain groups of mesh points for each of which the same partial differential equation and boundary condition are given. This aspect is shown in FIGS. 9 and 10. It is supposed that at the points in the object region of analysis indicated in FIG. 9 two sorts of partial differential equations, a and b, are given (step 521). The region is divided into a plurality of partial regions along the boundary between the partial differential equations in each of the directions of the axes of the coordinate. For example, in the x-direction it is divided at the boundary of the equation a and in the y-direction at the boundary between the equations a and b. As the result a figure indicated by 61 in FIG. 9 is obtained. FIG. 10 indicates the division operation based on the boundary condition. When boundary conditions c, d, e, f, g and h are given to the boundary portions of the object region of analysis (step 522), they are divided along the boundary between different boundary conditions in each of the directions of the axes of the coordinate. As the result a figure indicated by 71 in FIG. 10 is obtained.

Next, in the step 513 of FIG. 8, in order to make the shape of the extent of the FORTRAN DO loops (group of mesh points) obtained by division rectangular. The region is divided according to the shape of the region. FIG. 11 indicates an example of the division depending on the shape of the region. The region 523 is divided at the points, where the shape of the region changes, in each of the directions of the axes of the coordinate as in FIGS. 9 and 10.

Further in the step 514 of FIG. 8 the region is divided, depending on the difference rule. FIG. 12 indicates an example of the division depending on the difference rule. As indicated in the figure, different difference rules I to VI are given to the sides and the surfaces of the region and as in FIGS. 9 and 10, the region is divided along the boundaries between different difference rules for each of the directions of axes of the coordinate.

Figure 19:
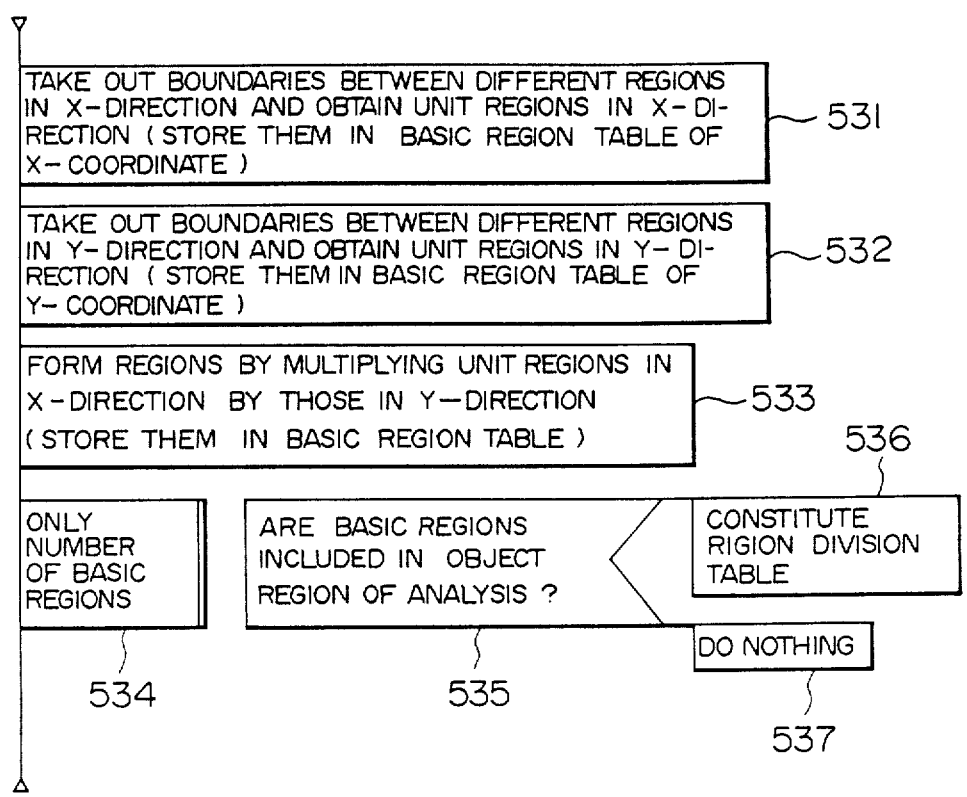
FIG. 19 illustrate further processing flows for the region dividing portions.

FIG. 19 indicates the flow according to PAD in detail for the division described above and FIG. 20 indicates an example of tables used in the processing for the division. In FIG. 19, at first (steps 531, 532), the boundaries between different regions in the X- and Y-directions are taken out and the object region is divided into partial regions for each of the directions of axes, which are stored in the basic region tables of X- and Y-coordinates, respectively. In the basic region tables of X- and Y-coordinates, lower and upper indexes are held, as indicated in steps 541 and 542 of FIG. 20. Then, tables (basic region tables 543: FIG. 20) are formed by multiplying the basic regions in the X-direction by those in the Y-direction. Among the basic regions those included in the object region of analysis are stored in the region division table as the result of the division (steps 533 to 537). FIG. 24 indicates the flow for explaining the example of processing described above.

By the method indicated above the object region of analysis is divided successively. This division result is that obtained by an AND operation, starting from the division results indicated in FIGS. 9, 10, 11 and 12 (FIG. 13). Furthermore the order of the divisions based on the partial differential equation and boundary condition, the shape of the region and the difference rule may be different from that indicated in the flow chart of FIG. 8.

In FIG. 13 a to h represent the kind of the equations and I to VI the sort of the difference rules. It should be understood, as indicated in the figure, that the partial regions resulted from the division are an assembly of regions, each of which has the same equation and the same discretization rule.

When the divisions based on the partial differential equation and boundary condition, the shape of the region and the difference rule are terminated, another division based on the width of discretization is performed. The division based on the width of discretization is carried out on each record of the region division data. When the partial differential equation stored in the region division data is discretized by the difference method similarly stored in the region division data, the width of discretization is calculated in order to find mesh points referring to those outside of the region (step 515).

The method for calculating the width of discretization is shown in FIG. 25. In FIG. 22, in order to obtain the width of discretization for a partial differential equation $$\frac{\partial}{\partial x}\left(\frac{\partial u}{\partial y}\right)=0,$$

it is sufficient to taken out the width between reference points for each of the directions on the basis of the difference rule delivered from the region division data and to add successively to each other. The calculation of the width is effected recursively, starting from the inside portion of the equation. At first the width of discretization of $(\partial u/\partial y)$ at the innermost point is obtained. In this example, since the difference rule of $(\partial/\partial y)$ refers to $j+1, j-1$, the width in the Y+direction is 1 and the width in the Y - direction is 1, while the width in the X - direction is ). For $(\partial/\partial x)$ at the outside, in the same way, 1 is obtained for the X± directions and 0 for the Y±direction. Adding them to the $(\partial/\partial y)$ width, 1 is obtained for the X±directions and 1 for the Y±directions for the width of discretization.

The width of discretization is effected in this way and if there are mesh points referring to points outside of the region, the region is further divided into two regions, one for which there are reference points outside of the object region and the other for which there are no reference points outside of the object region step 516. Such a new difference rule that there are no reference point outside of the region is given to the group of mesh points for which there are reference points outside of the region. FIG. 14 shows the aspect of this procedure. In the partial region indicated by 111 in FIG. 14 it is supposed that when the equation b is discretized by using the difference rule V, the width in the X±directions is 1, while the width in the Y±directions is 2. As indicated by 111 in FIG. 14, when it is finite differentiated at the point ·, reference points X are outside of the boundary. Therefore, the region 111 is divided into a region 112, for which there are no reference points outside of the boundary, and a region 113, for which there are reference points outside of the boundary. The division is terminated for the region 112. Since the difference rule V is inappropriate for the region 113, a new difference rule in the region 113 should be given. This resetting of the difference rule can be effected either by having previously set multiply difference rules having the priority for their intermediate data of difference rule (e.g. increasingly) and referring to a difference rule having a lower priority, when a rule having a higher priority is inappropriate, or by having determined a processing procedure so as to use a rule set at the boundary, with which the relevant region is in contact, as the standard, because such a situation can occur only at the neighborhood of the boundary. In the region 113 the width is obtained by using the reset difference rule and the procedure, by which the division based on the width is effected by using the width thus obtained, is repeated, until a pair of a dividing method and a difference rule giving no reference points outside of the boundary is found. Such a dividing procedure based on the width is effected for all the partial regions indicated in FIG. 13 and a division result as indicated in FIG. 15 is obtained as an example of the result.

When repetition of the division is terminated (step 517), the partial regions obtained by the division are merged (step 518). According to this region dividing method, since the region is divided unconditionally by boundaries between different regions in the directions of the axes of the coordinate, after the division there may be partial regions, which can be merged. It is possible to make the number of basic regions as small as possible by merging these partial regions, which can be merged, as many as possible and to enlarge the DO loop region. The mergence is effected for the partial regions, which have the same partial differential equation and discretization method, referring to data of region division, and which give rise to a rectangular region or a segmental region, when they are merged. This aspect will be explained while referring to FIG. 16. In FIG. 16 it is supposed that the division result indicated by 131 is obtained. Among these partial regions, those satisfying the condition described above are the boundaries 133 and 134 at the left side and the lower boundaries 135 and 136. Since both are segments also when they are merged, they are merged and give rise to 137 and 138. Each of the basic regions of the result of the region division 132 thus obtained consists of a group of mesh points having the same partial differential equation and the same discretization rule and further the number of basic regions is smallest.

The above description is an explanation of an embodiment. In this embodiment a case where the space is two-dimensional is adopted. However, it is possible to realize the automatic program preparation in the same way also when the space is one-dimensional three-dimensional, etc.

In addition, since the calculation code is determined in accordance with the partial differential equation and the shape of the region, it is possible to apply this method for an arbitrary equation and an arbitrary region, which can be represented by an assembly of rectangles.

Furthermore the generated program is not restricted to FORTRAN, but the automatic preparation can be realized for any language having a descriptive function, which is at the same level as that of FORTRAN, such as PL/1, PASCAL, etc.

According to this invention, the partial differential equation, the boundary condition, the difference rule and the shape of the region to be treated are not restricted, but it is possible to prepare automatically a program permitting a numerical simulation for any arbitrary mathematical model.

Further, the generated numerical simulation has the smallest number of DO loops and thus it has an effect to prepare automatically a numerical simulation, which can be efficaciously carried out.

What is claimed is:

1. A method for automatically generating by use of a computer a simulation program for simulating a phenomenon in a region by discretizing automatically data of a partial differential equation inputted when the partial differential equation and boundary conditions governing the phenomenon and data representing the shape of a region, which is an object of calculation, are given, by using a discretization rule by the finite differential method, and for generating a program calculating numerical values representative of the phenomenon determined by said partial differential equation over the whole object region of calculation by the finite differential method on the basis of the equation after the discretization, said method comprising the steps of:

dividing said object region of calculation into a plurality of blocks, each of which has the same differential equation and the same discretization rule; and generating a program which calculates, for each of said blocks numerical values representative of the phenomenon determined by the partial differential equation and the discretization rule both applied for each of the blocks by the finite differential method.

2. A method for automatically generating by use of a computer a simulation program according to claim 1, wherein the step of dividing said object region of calculation is effected so that the number of said blocks is smallest.

* * * * *